US006688489B2

United States Patent
Bloch et al.

(10) Patent No.: US 6,688,489 B2
(45) Date of Patent: Feb. 10, 2004

(54) PORTABLE AUTOMATIC FASTENER DELIVERY SYSTEM

(75) Inventors: Daniel D. Bloch, St. Peters, MO (US); Roy L. Barr, Carlsbad, CA (US); Edward E. Fiekert, St. Charles, MO (US); David McCoy, Creve Coeur, MO (US); Kevin J. Sitton, Winfield, MO (US); Ernst A. Oswald, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 45 days.

(21) Appl. No.: 09/931,501

(22) Filed: Aug. 16, 2001

(65) Prior Publication Data

US 2003/0034355 A1 Feb. 20, 2003

(51) Int. Cl.[7] .................................................. G07F 11/00
(52) U.S. Cl. ......................................... 221/88; 227/112
(58) Field of Search .............................. 221/3, 7, 9, 15, 221/88, 211, 124, 169; 227/112, 233

(56) References Cited

U.S. PATENT DOCUMENTS

| 5,004,141 A | 4/1991 | Young et al. ................ 227/112 |
| 5,193,717 A | 3/1993 | Rink et al. ................... 221/233 |
| 5,588,554 A | 12/1996 | Jones ........................... 221/88 |
| 5,664,311 A | 9/1997 | Banks et al. ............. 29/407.04 |
| 2002/0009391 A1 * | 1/2002 | Marquiss et al. ............. 422/63 |

* cited by examiner

Primary Examiner—Kenneth W. Noland
(74) Attorney, Agent, or Firm—Harness, Dickey & Pierce P.L.C.

(57) ABSTRACT

A portable fastener delivery system is provided that comprises an automated unloading mechanism that removes fasteners from a fastener storage device and delivers the fasteners through a delivery conduit to a work station. Generally, the portable fastener delivery system is mobile throughout a production facility so that fasteners may be delivered to a plurality of work stations. In operation, a signal is transmitted to a control system requesting a specific fastener configuration, and the control system causes positioning of the unloading mechanism adjacent the fastener storage device. A pneumatic source is then activated to cause the unloading mechanism to remove a fastener from the fastener storage device using a vacuum generator, and once the fastener is removed, the fastener is transported through a delivery conduit to the work station using pressurized air from the pneumatic source through a flexible fastener delivery tube.

75 Claims, 10 Drawing Sheets

To Work Station

Sec. A-A

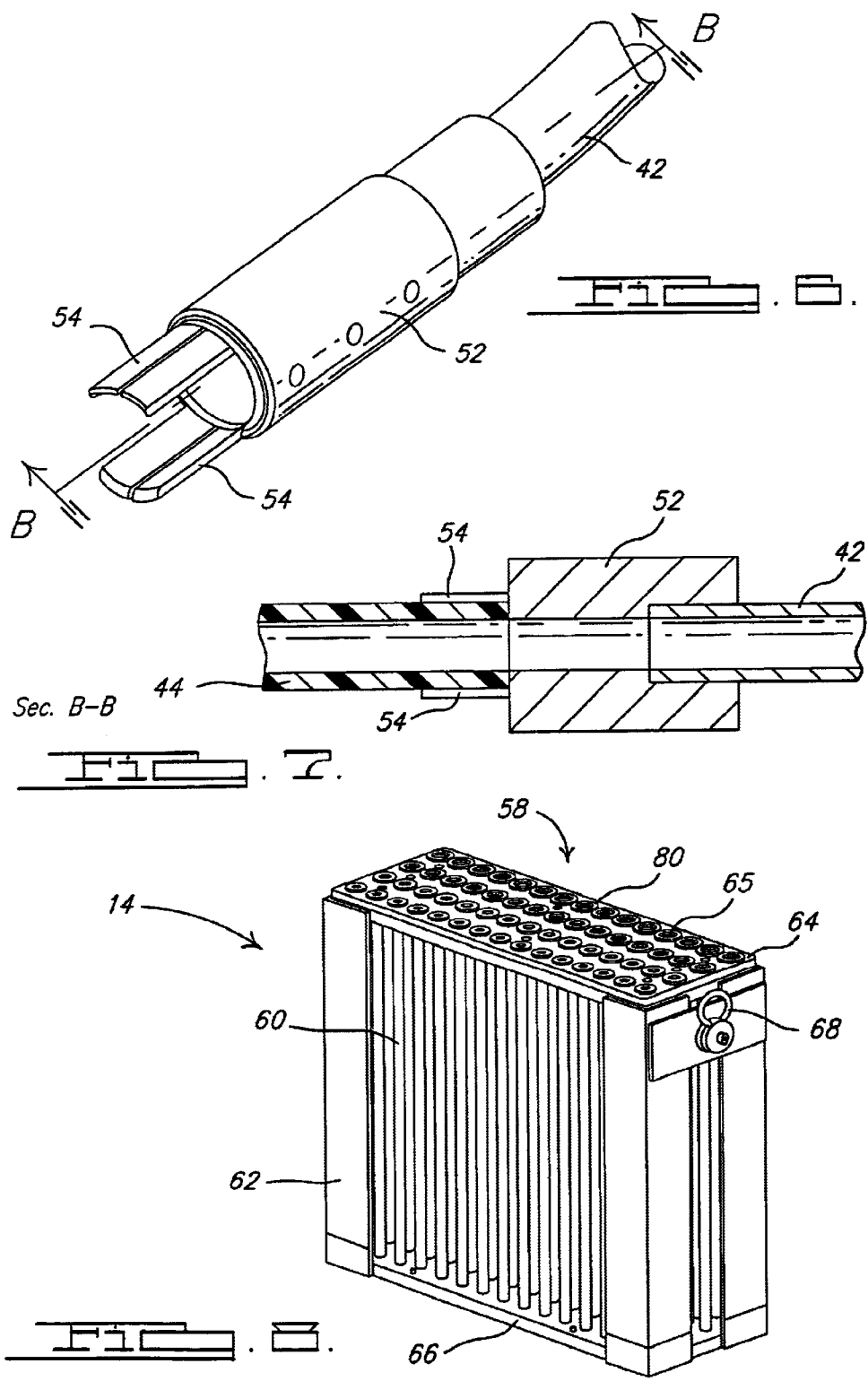

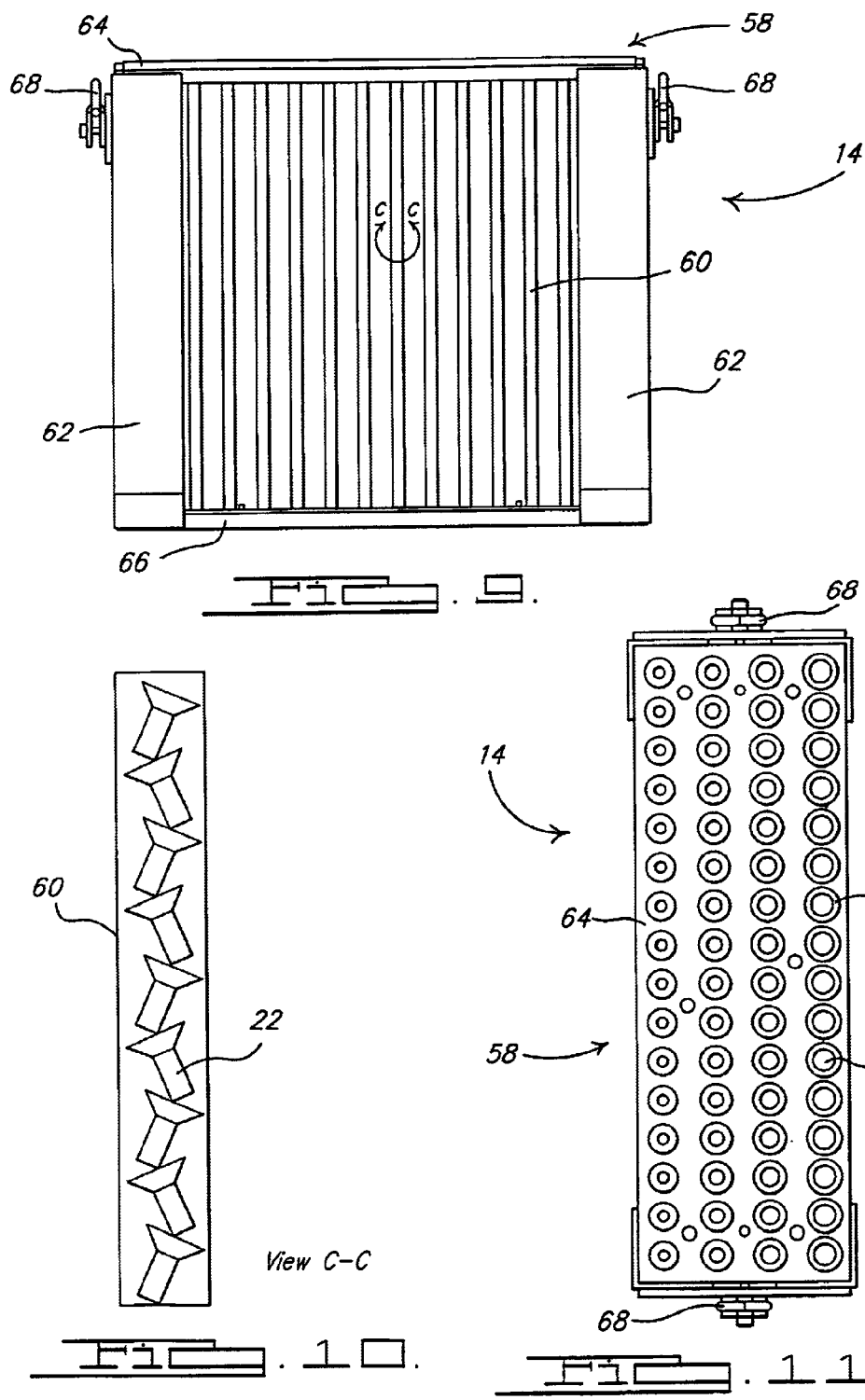

View E-E

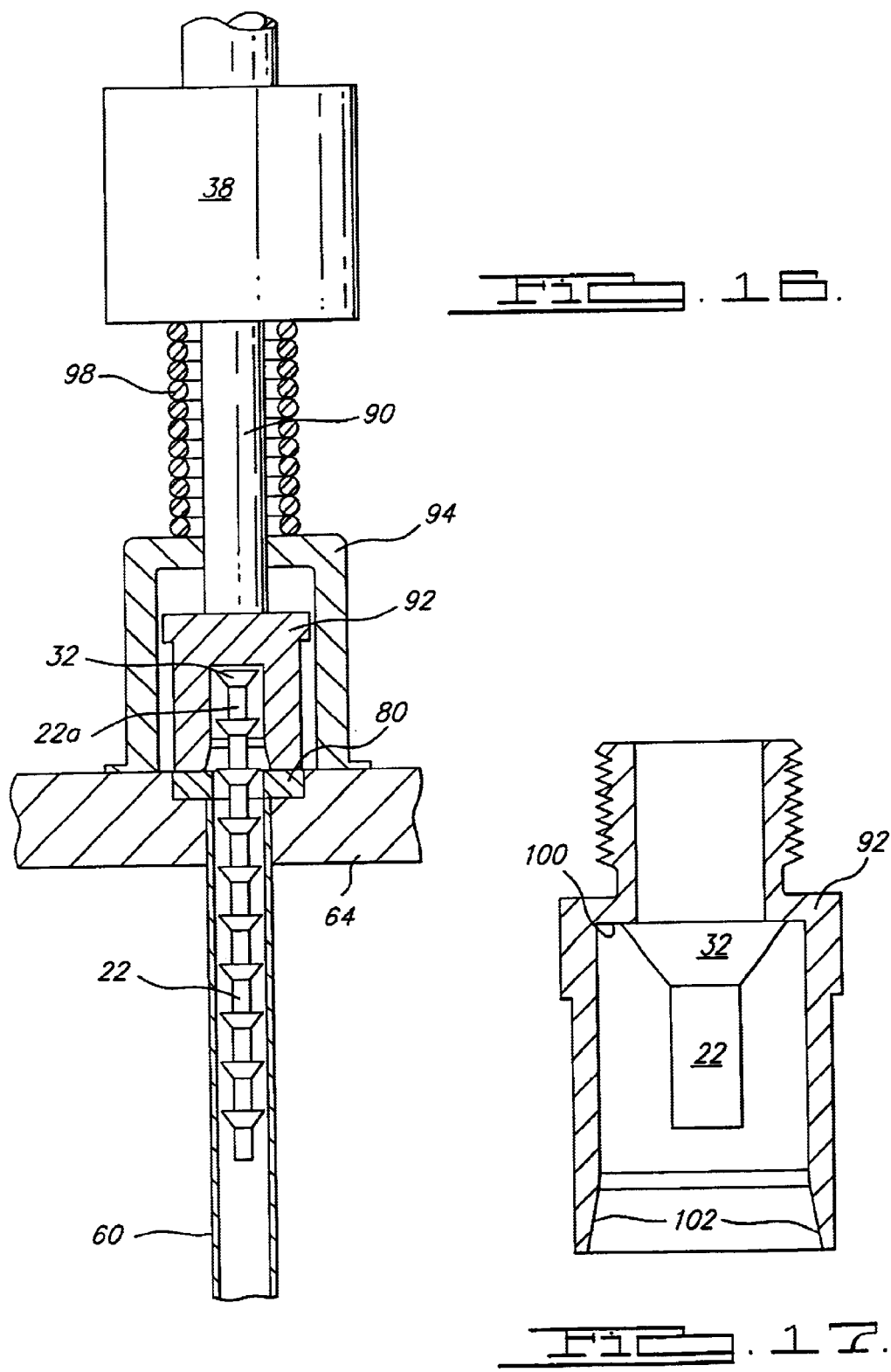

US 6,688,489 B2

PORTABLE AUTOMATIC FASTENER DELIVERY SYSTEM

FIELD OF THE INVENTION

The present invention relates generally to automated fastening equipment and more particularly to equipment that automatically delivers fasteners to a work station or a plurality thereof.

BACKGROUND OF THE INVENTION

Manufacturing equipment that automatically delivers fasteners to a workpiece, or a fastening device, is typically employed in high rate production environments. The equipment generally comprises a storage device for the fasteners and a mechanism or system that transports fasteners from the storage device to the workpiece or fastening device. For example, U.S. Pat. No. 5,588,554 to Jones, the contents of which are incorporated herein by reference in their entirety, discloses a device for delivering fasteners to a workpiece comprising a suction head that removes fasteners from a storage area and delivers the fasteners through a delivery tube using a vacuum. The fasteners are individually stored in holes of a predetermined or fixed depth, and only one fastener may be stored in any given hole. Accordingly, each hole contains a fastener of a specific configuration, diameter, and grip length. Moreover, the device of Jones is incorporated in a relatively large assembly system that is permanently installed at a fixed location within a production facility, and thus the fastener delivery system is not portable.

Yet another known art fastener delivery system is disclosed in U.S. Pat. No. 5,193,717 to Rink et al., wherein rivet cartridges are unloaded and rivets are delivered to a rivet machine or the like with pressurized air. The rivet cartridges are filled off line by a rivet pump that receives rivets from a vibrating bowl feeder, and the fasteners are delivered through a common passageway to a fastener installation tool. However, the fastener delivery system of Rink et al. requires a separate fastener escapement mechanism to remove and deliver the fasteners. Additionally, the fastener delivery system of Rink is mounted to a fixed base plate and is therefore not mobile or portable.

Unfortunately, automated fastener delivery equipment of the known art is substantially large in size and must be permanently installed into the flooring and existing structure of a manufacturing facility. U.S. Pat. No. 5,664,311 to Banks et al., the contents of which are incorporated herein by reference in their entirety, illustrates such an automated fastening system wherein a large assembly jig is mounted to a floor and consumes a substantial volume within a manufacturing facility. Furthermore, the parts or components that are being assembled must be positioned with tooling located within a working envelope of the automated fastener delivery equipment, which may also consume a substantial volume. Accordingly, the automated fastener delivery equipment of the known art is not portable and cannot be moved from work station to work station in order to deliver fasteners to a variety of assemblies and subassemblies.

In the production assembly of aircraft, the majority of substructure such as fuselage frames and longerons, along with wing spars and ribs, are joined to the skin of the aircraft with thousands of fasteners. Further, a plurality of fastener types, along with variations in diameters and grip lengths, are typically used in an aircraft assembly or subassembly. (Generally, a fastener grip length refers to the cumulative thickness of the parts that the fastener holds together). Moreover, a majority of the substructure parts are manually assembled and are not assembled using automated fastening equipment.

During manual assembly operations, an operator must first determine the appropriate fastener type and diameter from a blueprint or other manufacturing work instruction delivery system. Due to manufacturing variations in individual part fabrication and assembly positioning variations, the proper grip length of the fastener is often determined by manually measuring hole depths. Once the proper fastener configuration is determined, the fastener stock must then be located and selected from fastener bins, which are typically stored at a common location near the work station. A limited number of fasteners are then moved by hand from the fastener bins to the work station and are generally staged within the reach of an operator. If permitted by the work environment, several fasteners are stored in a pouch that is secured around the waist of an operator. Accordingly, the operator sorts through the fasteners to select the proper configuration and inserts the fastener directly into a hole through the parts or inserts the fastener into an installation tool that installs the fastener through the parts.

As a result, a significant amount of time is spent by an operator determining the proper fastener configuration, locating the fastener within a storage bin, and transporting the fastener to the work station for installation. In addition, the manual location and staging of fasteners introduces an increased risk of foreign object damage (FOD) from a dropped or misplaced fastener, which may result in severe damage to and/or inoperation of certain aircraft systems. Therefore, manual fastener installation procedures are time consuming and may also increase the risk of failure of aircraft systems.

Accordingly, a need remains in the art for an automated fastener delivery system that is portable and which efficiently delivers fasteners to at least one work station where parts are being manually assembled. The portable fastener delivery system should be capable of delivering a plurality of different fastener configurations, moreover to a plurality of work stations. The portable fastener delivery system should further be capable of automatically selecting the proper fastener configuration from a variety of inputs and should also be capable of maintaining a record of fastener inventory that is further integrated with existing production manufacturing systems.

SUMMARY OF THE INVENTION

In one preferred form, the present invention provides a portable fastener delivery system that comprises an unloading mechanism in communication with a fastener storage device, wherein a control system activates the unloading mechanism to remove a specific fastener configuration from the fastener storage device and transport the fastener to a delivery conduit, where the fastener is caused to be delivered to a work station. Generally, the unloading mechanism, fastener storage device, control system, and delivery conduit are disposed within a portable platform such as a mobile cart so that the fasteners may be delivered to a plurality of work stations located throughout a manufacturing facility.

The control system further employs a pneumatic source to remove the fasteners from the fastener storage device and deliver the fasteners through the delivery conduit. Generally, the pneumatic source removes the fasteners from the fastener storage device by activating a vacuum generator that draws a fastener into the unloading mechanism. Once the unloading mechanism is positioned adjacent the delivery conduit, the vacuum generator is deactivated, and the fastener is dropped into the delivery conduit. The pneumatic source is then activated to deliver the fastener to a work station using pressurized air through the delivery conduit.

In operation, the control system receives a request for a particular fastener configuration and positions the unloading mechanism adjacent the fastener storage device where the requested fastener is located. Preferably, the control system comprises a linear X-Y positioner that positions the unloading mechanism during operation of the portable fastener delivery system. The vacuum generator is then activated to remove the fastener from the fastener storage device and into the unloading mechanism. Accordingly, the unloading mechanism is positioned adjacent the delivery conduit using the linear X-Y positioner, and the vacuum generator is deactivated, which causes the fastener to drop into the delivery conduit.

The fastener is partially transported through the delivery conduit by gravity, and then the pneumatic source is activated to provide pressurized air to complete delivery of the fastener to the work station. Accordingly, the delivery conduit further comprises a proximity sensor, wherein when the fastener is transported past the proximity sensor, the proximity sensor notifies the control system, and the control system activates the pneumatic source to provide the pressurized air for delivery of the fastener.

More specifically, the delivery conduit further comprises a drop station having at least one drop plate defining a chute, wherein the fastener is dropped into the chute by the unloading mechanism. The chute is in communication with a fixed fastener delivery tube that is further in communication with a flexible fastener delivery tube, wherein the flexible fastener delivery tube extends from the portable platform to the work station where the fastener is delivered. Accordingly, the fastener is transported through the fixed fastener delivery tube by gravity and is further transported to the work station through the flexible fastener delivery tube by pressurized air from the pneumatic source. Preferably, the proximity sensor is positioned at the end of the fixed fastener delivery tube such that when the fastener passes the proximity sensor, the pneumatic source is activated to deliver the fastener through the flexible fastener delivery tube to the work station. Additionally, the delivery conduit may comprise a plurality of fixed and flexible fastener delivery tubes in order to deliver a variety of fastener types to a plurality of work stations throughout a manufacturing facility.

The fixed fastener delivery tube and the flexible fastener delivery tube are preferably connected using a fitting that comprises two flexible prongs. The fitting is attached to the fixed fastener delivery tube using, for example, welding or adhesive bonding, and the flexible fastener delivery tube is inserted between the two flexible prongs. The inside diameter defined by the flexible prongs is slightly larger than the outside diameter of the flexible fastener delivery tube such that the flexible fastener delivery tube is disposed within the flexible prongs with a clearance fit. To further secure the flexible fastener delivery tube, an adhesive tape is wrapped around the fitting proximate the flexible fastener delivery tube to seal and secure the connection between the fixed fastener delivery tube and the flexible fastener delivery tube. Alternately, other securement methods may be used to secure the flexible fastener delivery tube to the fitting such as a hose clamp, among others known in the art.

The fastener storage device is generally a fastener cassette that comprises a plurality of fastener storage tubes that house the fasteners. Each fastener storage tube houses a specific fastener configuration, which includes the fastener type (i.e. hi-lok, jo-bolt, rivet), diameter, and grip length. Accordingly, the fastener storage tubes range in diameter corresponding to the specific fastener configuration housed therein. Furthermore, the fastener storage device is removable from the portable fastener delivery system to facilitate ease of replacement when additional types of fasteners may be required or when the fastener storage device is moved to an assembly at another work station. Moreover, a plurality of fastener cassettes may be used as necessary within the portable fastener delivery system.

The fastener storage device is also stackable such that a plurality of fastener storage devices may be stored, for example, in a tool crib for use as required throughout a manufacturing facility. Moreover, the fastener storage device is reconfigurable, wherein an upper plate and a lower plate that accommodate the fastener storage tubes are interchangeable to facilitate a variety of fastener configurations. Additionally, the fastener storage tubes may also be interchangeable, wherein fastener tube cartridges that house the fastener storage tubes are removed and replaced depending on particular fastener configuration requirements.

The fasteners are generally removed from the fastener storage tube using the unloading mechanism, which further comprises an extractor tool and an extractor catcher disposed therein. The extractor catcher defines a tapered interior surface with a substantially flat upper inner surface in order to capture and secure a fastener when the vacuum generator is activated as previously described. When the extractor tool is positioned adjacent the appropriate fastener storage tube and the extractor catcher abuts the fastener storage device, the vacuum generator is activated and the entire stack of fasteners is drawn up through the fastener storage tube until the top fastener abuts the substantially flat upper surface of the extractor catcher. Preferably, the extractor tool and the extractor catcher are positioned against the fastener storage device using a vertical axis positioner. When the top fastener abuts the extractor catcher, the vacuum from the vacuum generator is sealed at the interface between the fastener and the extractor catcher, thereby causing the remaining stack of fasteners to drop back down into the fastener storage tube. As a result, a single fastener is removed from the stack of fasteners without the need for a separate escapement mechanism.

Once the fastener is secured within the extractor catcher, the control system positions the unloading mechanism adjacent the delivery conduit, wherein the fastener is delivered using pressurized air from the pneumatic source as previously described. Accordingly, the portable fastener delivery system automatically delivers a variety of different fastener configurations to one or a plurality of work stations, thereby reducing assembly time and the risk of FOD during fastening operations.

The control system that activates the pneumatic source and positions the unloading mechanism is preferably operated using a computing device such as a personal computer or programmable logic controller with control software specifically programmed for delivery of fasteners to a work station. Generally, input to the personal computer is the request for a specific fastener configuration, which may be manually entered using a keyboard or touch screen of the personal computer or transmitted to the control system with an input device such as an electronic grip length checker, a microphone, a computer operated pendant, a bar code reader or other auto identification system, or other device commonly known in the art. Further, the output of the personal computer generally comprises the positions for the unloading mechanism adjacent the appropriate fastener storage tube and adjacent the delivery conduit, along with signals that activate the pneumatic source throughout the delivery process. Additional control system electronics and pneumatics are also activated by the personal computer as further described hereinafter.

The control software comprises a database of fastener configurations, along with a real-time inventory of the fasteners housed within the fastener storage tubes as the fasteners are being delivered to the work station. The database further comprises system parameters and fastener parameters, wherein the system parameters further comprise parameters for the fastener storage device that include, for example, the position of each fastener storage tube, the fastener configuration in each tube, and the current number of fasteners in each tube.

The control software database is preferably coordinated with a master fastener database so that duplication of data is minimized. In addition, the database may be in communication with other inventory systems within a manufacturing environment for more efficient production control. Further, the software may be coordinated with data from a product data manager (PDM), wherein specific engineering call-outs for fasteners in a specific assembly are used by the software to deliver fasteners to the work station. Moreover, fastener data may be used to generate a digital image of an assembly with the position and configuration of each fastener therein. The digital image is preferably presented on a monitor or screen of the personal computer for viewing and interrogation by the operator or other manufacturing personnel.

In operation, the control system receives a request for a specific fastener configuration, which may be through computer entry, e.g., touch screen, keyboard, signal reception from hole measuring device, voice activation, or other methods commonly known in the art. The control system then activates the linear X-Y positioner to position the unloading mechanism adjacent the proper fastener storage tube within the fastener storage device. Once the unloading mechanism is properly positioned, the pneumatic source is activated to position the extractor tool and the extractor catcher down against the fastener storage device using the vertical axis positioner such that the extractor catcher is in communication with the fastener storage tube. The pneumatic source then activates the vacuum generator, and as a result, the entire stack of fasteners within the fastener storage tube is drawn up against the extractor catcher. When the top fastener abuts the flat upper surface of the extractor catcher, the vacuum is sealed at the interface between the top fastener and the extractor catcher, and thus the remaining fasteners fall back down into the fastener storage tube.

Once the extractor catcher acquires the fastener, the linear X-Y positioner positions the unloading mechanism adjacent the drop station, and more specifically, positions the extractor catcher adjacent the appropriate chute. The control system then deactivates the pneumatic source, which deactivates the vacuum generator, and the fastener drops from the extractor catcher through the chute and into the fixed fastener delivery tube. Accordingly, the fastener is transported through the fixed fastener delivery tube by gravity. Once the fastener passes beyond the proximity sensor, the control system activates the pneumatic source once again, which provides pressurized air to the flexible fastener delivery tube to deliver the fastener to the work station. In one form of the present invention, the entire fastener delivery process, from the time of the request for a fastener to the time the fastener arrives at the work station is less than approximately three (3) seconds.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is an orthogonal view of a fitting that connects a fixed fastener delivery tube and a flexible fastener delivery tube in accordance with the present invention;

FIG. 7 is a cross-sectional view, taken along line B—B of FIG. 6, of a fixed fastener delivery tube connected to a flexible fastener delivery tube in accordance with the present invention;

FIG. 8 is an orthogonal view of a fastener storage device in accordance with the present invention;

FIG. 9 is a side view of a fastener storage device in accordance with the present invention;

FIG. 10 is an enlarged view, taken from view C—C of FIG. 9, of a fastener storage tube housing a plurality of fasteners in accordance with the present invention;

FIG. 11 is a top view of a fastener storage device in accordance with the present invention;

FIG. 16 is a cross-sectional view of extractor catchers abutting a fastener storage device in accordance with the present invention;

FIG. 17 is an enlarged cross-sectional view of an extractor catcher in accordance with the present invention;

DETAILED DESCRIPTION OF THE PREFERRED EMBODIMENTS

The following description of the preferred embodiments is merely exemplary in nature and is in no way intended to limit the invention, its application, or uses.

Figure 1:
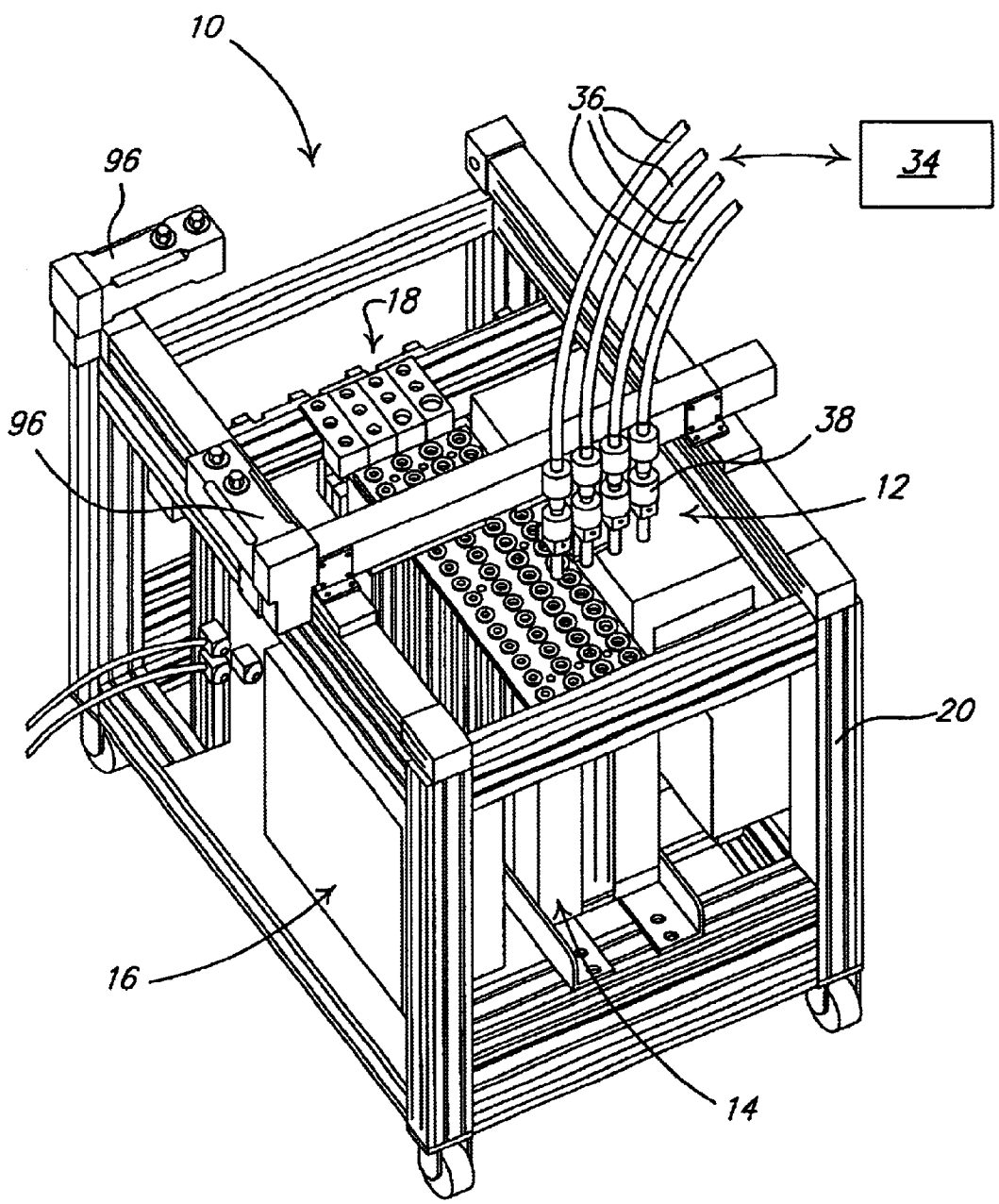
FIG. 1 is an orthogonal view of a portable fastener delivery system in accordance with the present invention.
Figure 2:
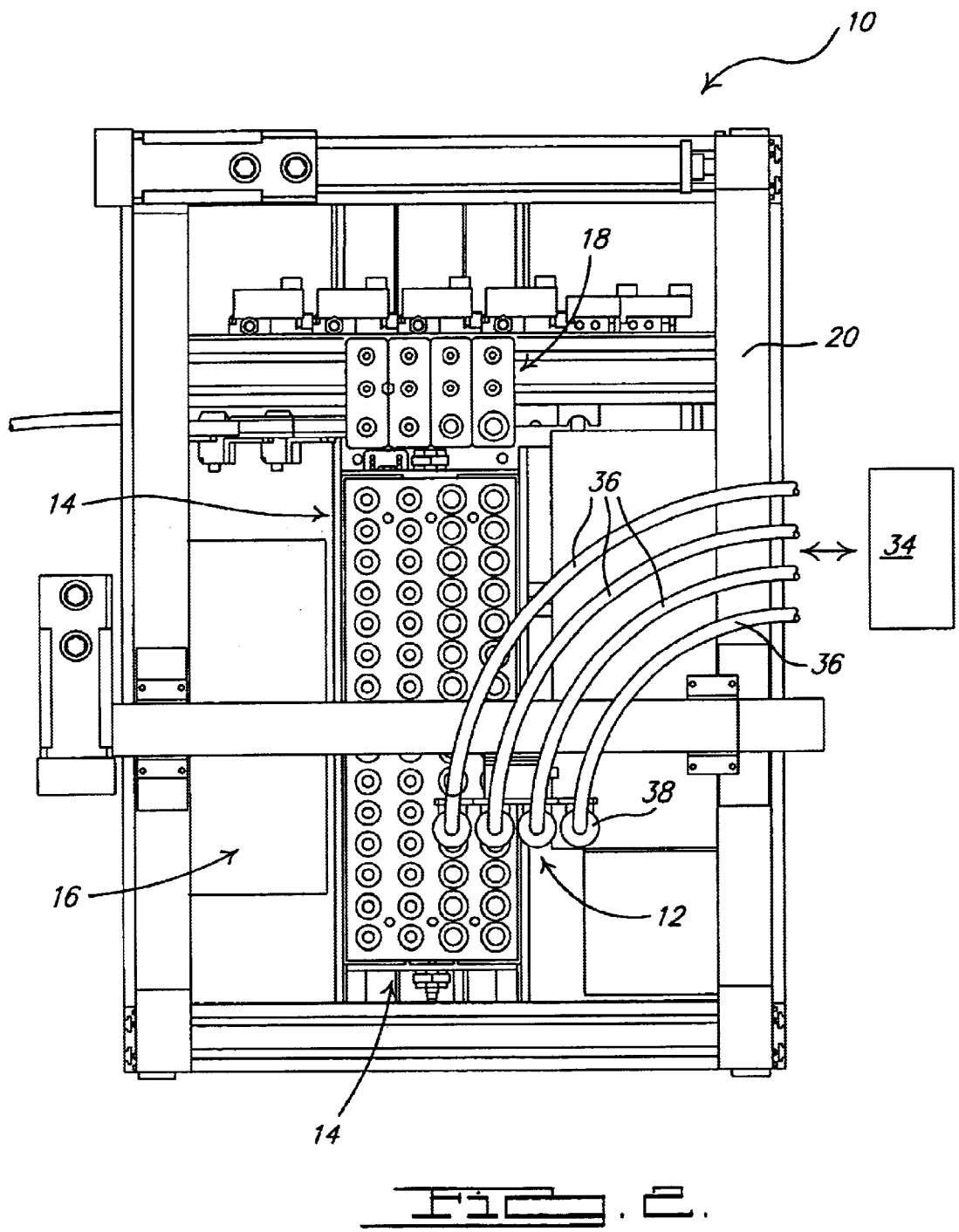
FIG. 2 is a top view of a portable fastener delivery system in accordance with the present invention.

Referring to the drawings, a portable fastener delivery system according to the present invention is illustrated and generally indicated by reference numeral 10 in FIGS. 1 and 2. The portable fastener delivery system 10 generally comprises an unloading mechanism 12 in communication with a fastener storage device 14, wherein a control system 16 causes the unloading mechanism 12 to remove a fastener having a specific configuration from the fastener storage device 14 and transport the fastener to a delivery conduit 18, wherein the fastener is delivered to a work station. As shown, the portable fastener delivery system 10 is disposed within a portable platform such as a mobile cart 20 so that a variety of fasteners may be delivered to a plurality of work stations located throughout a manufacturing facility.

Figure 3:
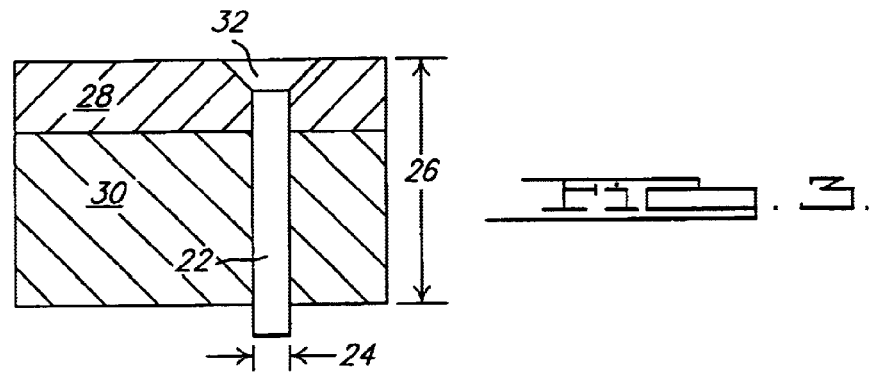
FIG. 3 is a cross-sectional view of a typical fastener installation in accordance with the present invention.

For purposes of clarity, a typical fastener configuration is illustrated in FIG. 3 in order to define terminology as used herein. As shown, the fastener 22 generally comprises a diameter 24, and a grip length 26, wherein the grip length 26 is approximately equal to the cumulative thickness of the parts 28 and 30 that the fastener 22 holds together. The fastener 22 also comprises a head 32, which may be flush or countersunk as shown, among other variations including, but not limited to, protruding heads.

Referring back to FIGS. 1 and 2, the portable fastener delivery system 10 generally removes and delivers fasteners using a pneumatic source 34, which is preferably 90 psi (pounds per square inch) shop air. The pneumatic source 34 is activated by the control system 16 and is in communication with both the unloading mechanism 12 and the delivery conduit 18 through flexible tubing 36. (The fittings that connect the pneumatic source 34 and the flexible tubing 36 are not shown for clarity). The pneumatic source 34 activates one or a plurality of vacuum generators 38 to remove a fastener from the fastener storage device 14 and secure the fastener within the unloading mechanism 12 as more fully described below. Once the fastener is secured within the unloading mechanism 12, the control system positions the unloading mechanism 12 adjacent the delivery conduit 18, wherein the vacuum generators 38 are deactivated and the fastener is transported through the delivery conduit 18 by gravity and by pressurized air from the pneumatic source 34 as described in greater detail below.

The portable fastener delivery system 10 may further comprise a protective cover (not shown) to protect the system during periods of non-use and also to minimize hazards to personnel working in the vicinity thereof during system operation. Preferably, the protective cover encases the entire portable fastener delivery system 10 and is capable of being easily transported along with the mobile cart 20 to a variety of locations throughout a manufacturing facility. The protective cover may also comprise one or a plurality of access doors, hinges, and/or latches for ease of installation and removal and for access to components of the portable fastener delivery system 10 as described herein.

Delivery Conduit

Figure 4:
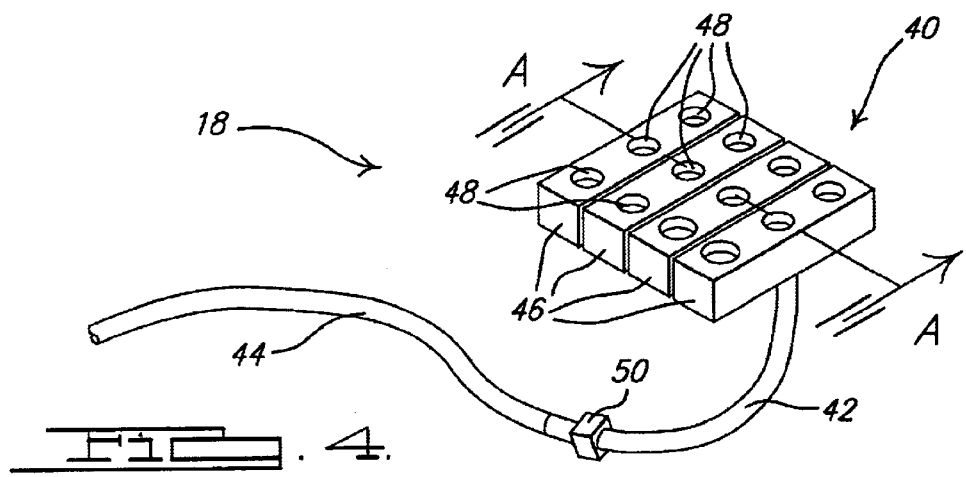
FIG. 4 is an orthogonal view of a delivery conduit in accordance with the present invention.
Figure 5:
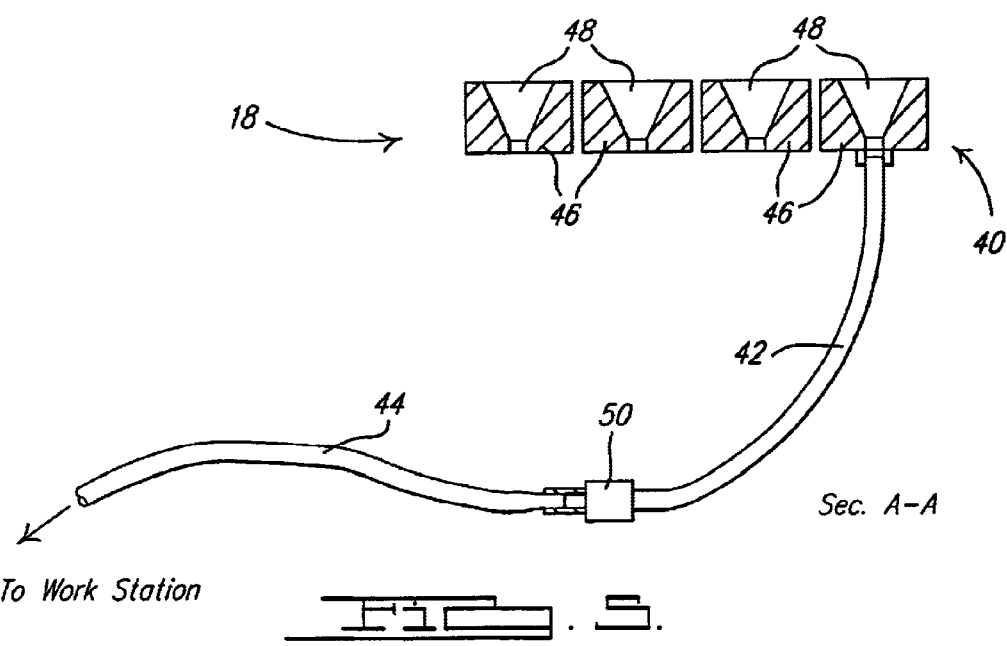
FIG. 5 is a cross-sectional view, taken along line A—A of FIG. 4, of a delivery conduit in accordance with the present invention.

Referring to FIGS. 4 and 5, the delivery conduit 18 further comprises a drop station 40 in communication with a fixed fastener delivery tube 42 and a flexible fastener delivery tube 44. As shown, the drop station 40 further comprises a plurality of drop plates 46 that define chutes 48, through which the fasteners are dropped as previously described. Preferably, the chutes 48 are tapered as shown, although a variety of shapes may be employed to effectuate transport of the fastener through the delivery conduit 18. The plurality of drop plates 46 are employed to facilitate rapid interchangeability for a variety of fastener configurations. Alternately, a single drop plate may be employed rather than the plurality of drop plates 46 as shown.

As further shown, the fixed fastener delivery tube 42 extends from the drop station 40 and is in communication with the flexible fastener delivery tube 44. Generally, a fastener is transported through fixed fastener delivery tube 42 by gravity until the fastener passes beyond a proximity sensor 50. When the proximity sensor 50 detects the presence of a fastener, the proximity sensor 50 notifies the control system 16, and the control system 16 then activates the pneumatic source 34 (not shown). Accordingly, the pneumatic source 34 provides pressurized air through the flexible fastener delivery tube 44 to deliver the fastener to the work station.

The fixed fastener delivery tube 42 is preferably rigid in order to facilitate efficient transport of the fastener by gravity. Accordingly, the fixed fastener delivery tube 42 is preferably fabricated from aluminum tube stock or other rigid material commonly known in the art. The flexible fastener delivery tube 44, as the name implies, is flexible so that the fastener may be delivered to a plurality of work stations throughout a manufacturing facility. Accordingly, the length of the flexible fastener delivery tube 44 may be varied to accommodate the required distance from the portable fastener delivery system 10 to the work station. As shall be described in greater detail below, the amount of time that the pneumatic source 34 provides pressurized air through the flexible fastener delivery tube 44 is a function of the length of the delivery tube and the fastener configuration being delivered, and therefore, the amount of time that pneumatic source 34 is activated must be adjusted according to the length of the flexible fastener delivery tube 44.

Additionally, the inner diameter of the flexible fastener delivery tube 44 should be sized appropriately to prevent tumbling of the fastener along the length thereof, which is generally a function of the overall size of the fastener. Generally, the inner diameter of the flexible fastener delivery tube 44 should be slightly larger than the diameter of the fastener head yet smaller than the overall length of the fastener to prevent tumbling. Further, the flexible fastener delivery tube 44 is fabricated from relatively soft and flexible plastic such as nylon with a relatively smooth inner surface to minimize friction between the fastener and the inner wall of the flexible fastener delivery tube 44.

Referring to FIGS. 6 and 7, fixed fastener delivery tube 42 and flexible fastener delivery tube 44 are preferably connected using a fitting 52 that comprises flexible prongs 54 as shown. The inner diameter of the flexible prongs 54 is slightly larger than the outer diameter of the flexible fastener delivery tube 44 such that the flexible fastener delivery tube 44 is disposed within the fitting 52 with a clearance fit. Preferably, the flexible fastener delivery tube 44 is further secured and sealed to the fitting 52 using an adhesive tape (not shown), which is wrapped around the periphery of the fitting 52. Additionally, other methods commonly known in the art such as hose clamps or adjustable straps, among others, may also be employed to further secure and seal the flexible fastener delivery tube 44 to the fitting 52. Further, the fitting 52 is secured to the fixed fastener delivery tube 42 using methods commonly known such as welding or adhesive bonding, among others.

The delivery conduit 18 may further comprise a plurality of drop stations 46, fixed fastener delivery tubes 42, and flexible fastener delivery tubes 44 according to the requirements of a specific manufacturing assembly. Accordingly, the illustration of four drop stations 46 and corresponding fixed fastener delivery tubes 42 and flexible fastener delivery tubes 44 shall not be construed as limiting the scope of the present invention.

Fastener Storage Device

Referring now to FIGS. 8–11, the fastener storage device 14 according to the present invention generally comprises a fastener cassette 58 defining a plurality of fastener storage tubes 60 housed within a frame 62. Each fastener storage tube 60 houses a specific fastener configuration, i.e. type, diameter, and grip length, and the fastener storage tubes 60 are secured within the fastener cassette 58 to an upper plate 64 and a lower plate 66. Preferably, the fastener storage tubes 60 are a semi-rigid plastic and thus may be flexed slightly to be inserted into upper apertures 65 formed in the upper plate 64 and lower apertures 67 (not shown) formed in the lower plate 66. Additionally, the upper apertures 65 and the lower apertures 67 are preferably chamfered to facilitate installation and removal of the fastener storage tubes 60. The fastener storage tubes 60 are also vented to atmosphere at their lower ends to facilitate generation of a lifting force within the fastener storage tube 60 by the vacuum generator.

Referring to FIG. 10, the fasteners 22 are preferably stacked end-to-end and generally rest within the fastener storage tube 60 as shown. Accordingly, the diameter of the fastener storage tube 60 should be sized appropriately to prevent tumbling of the fasteners 22 and to allow for ease of loading, either manually or automatically, of the fasteners 22 within the fastener storage tube 60. For example, in one preferred form, the inner diameter of the fastener storage tube 60 is approximately 10 mm (0.39 in.) for a hi-lok fastener having a diameter of 4.76 mm (0.1875 in.) and a grip length of 14.29 mm (0.5625 in.) Preferably, the fastener storage tubes 60 are a clear, semi-rigid plastic such as polyvinyl, however, other materials commonly known in the art may also be employed.

As further shown in FIGS. 8 and 11, the upper plate 64 further comprises a plurality of seals 80 disposed around the upper apertures 65. The seals 80 are preferably seated within a counterbore (not shown) in the upper plate 64 and are further adhesively bonded therein. Additionally, the seals 80 are disposed within the counterbore with a clearance fit. Generally, the seals 80 are employed to provide a sealed connection between the fastener storage tube 60 and the unloading mechanism 12 when a fastener is being removed from a fastener storage tube 60 as described in greater detail below. Accordingly, the seals 80 in one form are rubber, although other materials commonly known in the art may also be employed.

The fastener cassette 58 may comprise a plurality of fastener storage tubes 60 having different diameters to accommodate a variety of different fastener configurations. As shown, the fastener cassette 58 is capable of housing up to 60 variations of fastener type, diameter, and grip length with the use of 60 fastener storage tubes 60. Additionally, different fastener cassettes 58 may be employed that contain a predetermined set of fastener configurations. Accordingly, the overall size of fastener cassette 58 may be larger or smaller than the embodiment illustrated herein, and the use of four (4) different diameters and fifteen (15) rows for a total of sixty (60) fastener storage tubes 60 shall not be construed as limiting the scope of the present invention.

The fastener storage tubes 60 may further be oriented according to specific application requirements and are not limited to a vertical configuration as described herein. For example, the fastener storage tubes 60 may be canted at an angle (not shown), or may be coiled (not shown) to reduce space requirements, among other configurations. Additionally, the fastener storage tubes 60 may be housed within fastener tube cartridges (not shown) that are removable from the fastener cassette 58 in order to efficiently replace fastener configurations as necessitated by a particular assembly. Similarly, the upper plate 64 and a lower plate 66 as previously described may also be removable to accommodate a variety of different fastener configurations as required.

Figure 12:
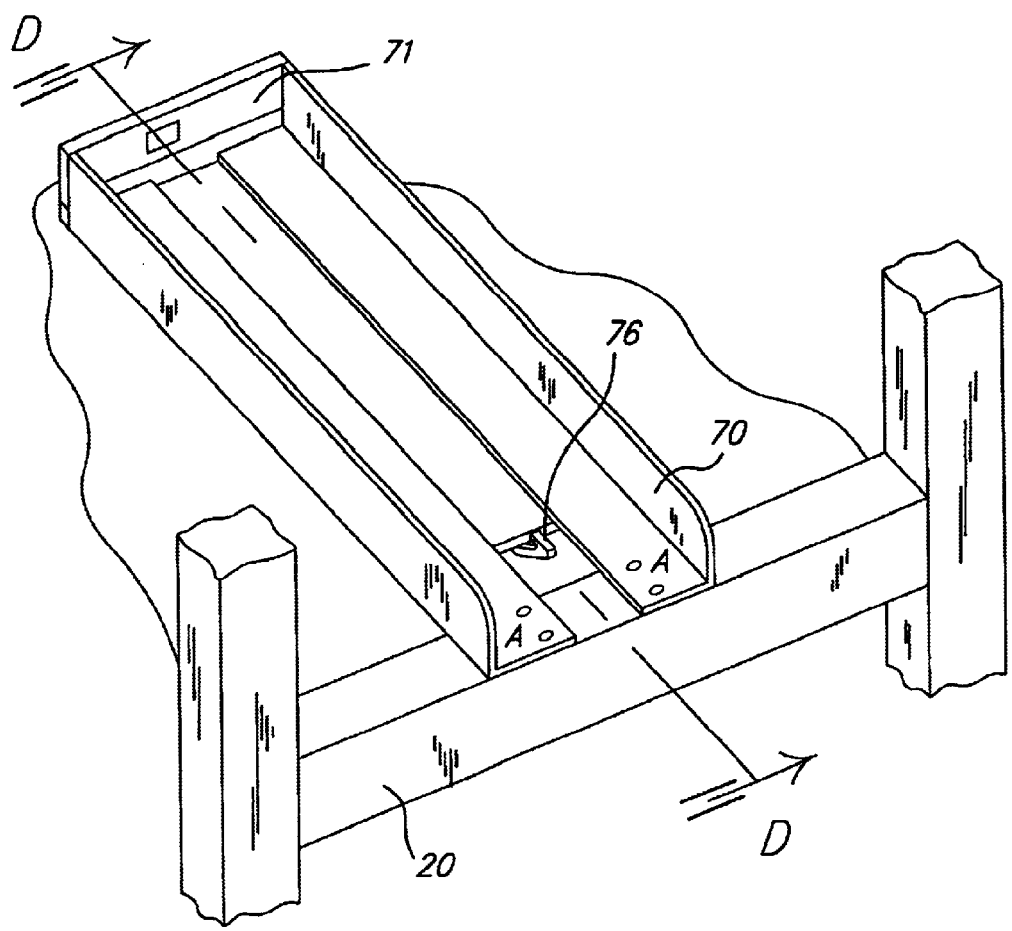
FIG. 12 is an orthogonal view of a fastener cassette cradle and a fastener cassette locating system in accordance with the present invention.

The fastener cassette 58 is preferably removable from the portable fastener delivery system 10. Accordingly, the fastener cassette 58 further comprises handles 68 as shown for installation, transport, and removal thereof. Furthermore, the fastener cassette 58 is inserted within the portable fastener delivery system 10 along a fastener cassette cradle 70, which is mounted to the frame 20 as shown in FIG. 12. The fastener cassette 58 (not shown) is positioned on the fastener cassette cradle 70 at position A and is slid along the fastener cassette cradle 70 into position against stop 71. The fastener cassette 58 is then secured in place using the pivoted latch 76, which engages the lower plate 66 of the fastener cassette 58 as described in greater detail below. Accordingly, the fastener cassette 58 is slidably disposed along the fastener cassette cradle 70.

Figure 13:
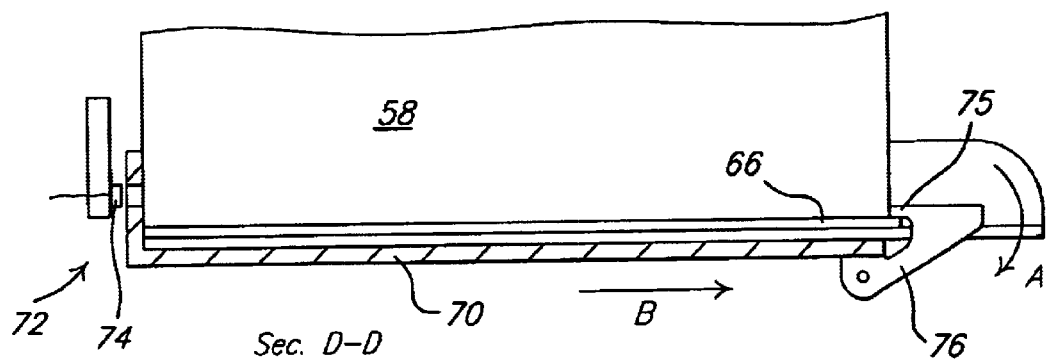
FIG. 13 is a cross-sectional view, taken along line D—D of FIG. 12, of a fastener cassette locating system in accordance with the present invention.

Referring to FIG. 13, proper positioning of the fastener cassette 58 within the fastener cassette cradle 70 is communicated to the control system 16 with a fastener cassette locating system 72. In one form, the locating system 72 comprises a position switch 74 and the pivoted latch 76 as shown. The position switch 74 senses the proximity of the fastener cassette 58 at one end thereof and communicates the proper position to the control system 16. Further, the pivoted latch 76 engages the lower plate 66 of the fastener cassette 58 at the other end as shown to secure the fastener cassette 58 to the fastener cassette cradle 70. In another form, a second position switch 75 is disposed on the pivoted latch 76 as shown, to further communicate to the control system 16 that the fastener cassette 58 is locked in place.

To remove the fastener cassette 58, the pivoted latch 76 is rotated down in the direction of arrow A so that the fastener cassette 58 may be slidably removed from the fastener cassette cradle 70 in the direction of arrow B as shown. When the fastener cassette 58 is removed, the position switch 74 communicates to the control system 16 that the fastener cassette 58 is not in position for operation of the portable fastener delivery system 10.

The fastener cassette 58 may further comprise a read-write device (not shown) that is disposed, for example, on the side of the fastener cassette 58, hereinafter referred to as a smart cassette. Generally, the smart cassette would maintain real-time information relating to the number of fasteners and the specific fastener configurations contained within each fastener storage tube 60. Accordingly, the fastener cassette 58 would constantly be aware of its contents and could relay such information to other production control systems as required.

In another form, the portable fastener delivery system 10 may comprise a plurality (not shown) of fastener cassettes 58 according to specific application requirements. Accordingly, the detailed description of a single fastener cassette 58 as described herein shall not be construed as limiting the scope of the present invention.

Unloading Mechanism

Figure 14:
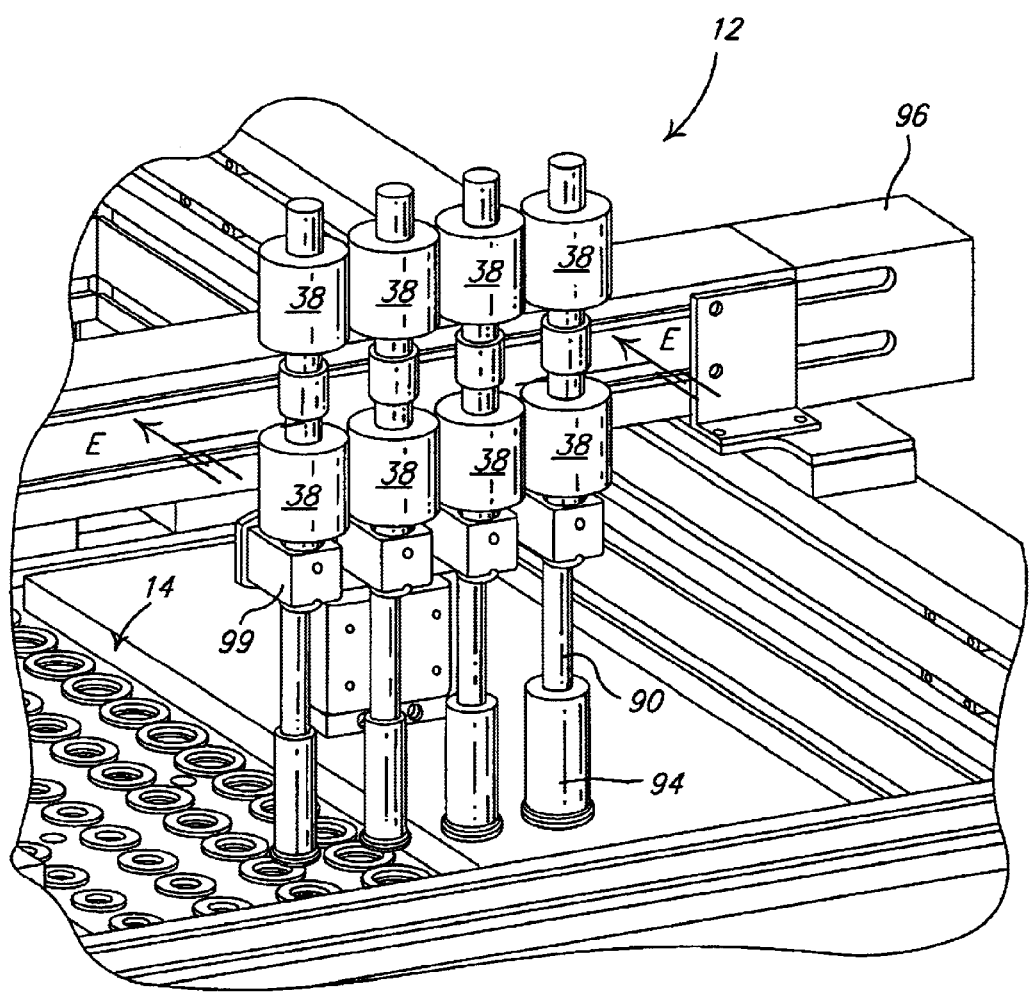
FIG. 14 is an orthogonal view of an unloading mechanism in accordance with the present invention.
Figure 15:
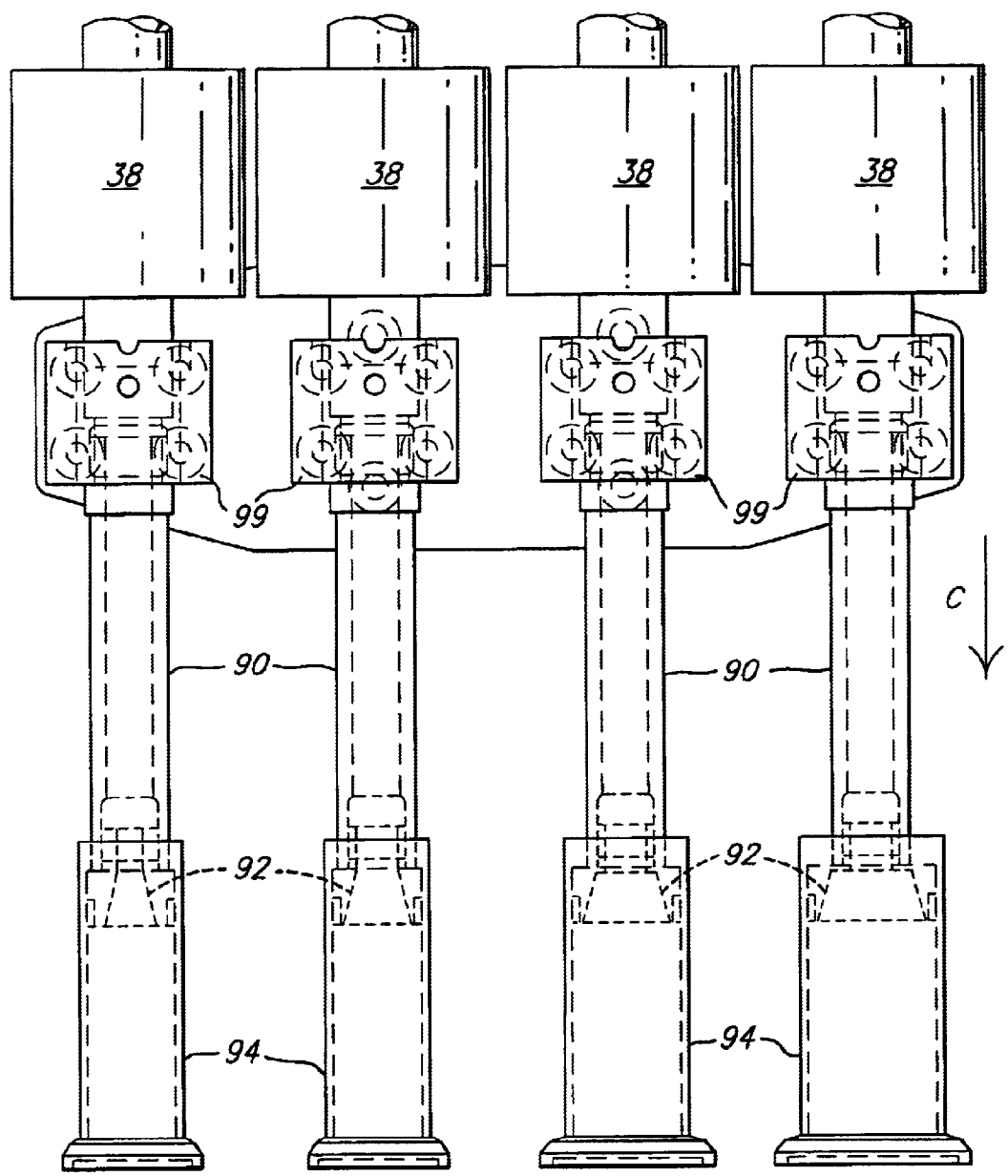
FIG. 15 is a cross-sectional view, taken along line E—E of FIG. 14, of extractor tools and extractor catchers in accordance with the present invention.

Referring now to FIGS. 14–16, the unloading mechanism 12 generally comprises an extractor tool 90 having an extractor catcher 92 attached thereto, and alternately, an extractor shroud 94 disposed around the extractor catcher 92. As further shown, the vacuum generators 38 are disposed at an upper end of the extractor tool 90 and the extractor catcher 92 is disposed at a lower end of the extractor tool 90 inside the extractor shroud 94. The extractor shroud 94 is optional with certain extractor catcher 92 configurations in order to provide a sealed connection between the fastener storage tube 60 and the extractor catcher 92 and also to prevent fasteners from swinging out of a vertical position as described in greater detail below.

Generally, the unloading mechanism 12 is positioned adjacent the fastener storage device 14 using a linear X-Y positioner 96 that is activated by the control system 16 (not shown). More specifically, the linear X-Y positioner 96 positions an extractor catcher 92 adjacent the appropriate fastener storage tube 60 that contains the requested fastener. Accordingly, the X and Y position of each fastener storage tube 60 is stored within the control system 16 as described in greater detail below. Additionally, the extractor tool 90, along with the extractor catcher 92 attached thereto, are translated in the vertical direction (as indicated by arrow C) with a vertical axis positioner 99 as shown. The extractor catcher 92 is translated in the vertical direction in order to engage the fastener storage tube 60 for removal of the requested fastener as described in further detail below. Moreover, the vertical axis positioner 99 is pneumatically controlled and is therefore activated by the pneumatic source 34.

The extractor shroud 94 generally provides a sealed connection between the fastener storage tube 60 and the extractor catcher 92. Additionally, the extractor shroud 94 prevents the fasteners from swinging out of the vertical position while the fasteners are being moved up through a fastener storage tube 60 as described in greater detail below. Accordingly, the extractor shroud 94 prevents the fasteners from dropping out of the extractor catcher 92 prematurely due to fastener swing. In addition, the extractor shroud 94 may further comprise an o-ring groove and o-ring on the bottom thereof to improve the seal between the fastener storage tube 60 and the extractor catcher 92.

In operation, the control system 16 activates the linear X-Y positioner 96 to the position unloading mechanism 12 adjacent the fastener storage device 14, and more specifically, to position an extractor catcher 92 adjacent the appropriate fastener storage tube 60. Once the proper extractor catcher 92 is positioned adjacent the appropriate fastener storage tube 60, the vertical axis positioner 99 moves the extractor tool 90 in the vertical direction until the extractor catcher 92 abuts the seal 80 and the extractor shroud 94 abuts the upper plate 64 as shown in FIG. 16. As further shown, the extractor shroud 94 is forced against the fastener storage device 14 with an extractor spring 98, which further provides sealed communication between the fastener storage tube 60 and the extractor catcher 92 when the vacuum generators 38 are activated to remove a fastener. Alternately, the extractor shroud 94 and extractor spring 98 may be replaced by positioning the extractor catcher 92 having a certain configuration, as described in greater detail below, firmly against the seal 80.

Once the extractor catcher 92 is positioned against the seal 80 of the appropriate fastener storage tube 60, the pneumatic source 34 (not shown) then activates the vacuum generators 38, and as a result, all of the fasteners 22 within the fastener storage tube 60 move up against the extractor catcher 92 as shown. Once the fastener head 32 of a top fastener 22a abuts the extractor catcher 92, a seal is created at the interface between the top fastener 22a and the extractor catcher 92, thereby causing the remaining fasteners 22 to drop back into the fastener storage tube 60. As a result, the unloading mechanism 12 removes the top fastener 22a from the fastener storage device 14 without the need for a separate fastener escapement mechanism.

Referring to FIG. 17, a configuration for the extractor catcher 92 that does not require a shroud 94 is illustrated in further detail. As shown, the fastener head 32 of a fastener 22 abuts an upper surface 100 of the extractor catcher 92 to create a sealed connection between therebetween. In operation, the sealed connection causes the remaining fasteners to drop back into the fastener storage tube 60 as previously described. As further shown, the extractor catcher 92 also comprises a tapered inner surface 102 to further facilitate ease of removal of the fastener 22 from the fastener storage device 14.

Alternately, the upper surface 100 of the extractor catcher 92 may be modified to accommodate various types of fastener heads as required in order to eliminate the need for the extractor shroud 94 and the associated extractor spring 98. Generally, the extractor shroud 94 and the associated extractor spring 98 may be eliminated as long as a proper seal is maintained and the fasteners do not swing out of vertical as previously described.

Although four (4) extractor tools 90, each having two (2) vacuum generators 38, are illustrated herein, the portable fastener delivery system 10 according to the present invention may comprise any number of extractor tools 90 and vacuum generators 38 to remove fasteners in accordance with specific operating requirements. Therefore, the use of four (4) extractor tools 90 with two (2) vacuum generators 38 each shall not be construed as limiting the scope of the present invention.

Control System

Figure 18:
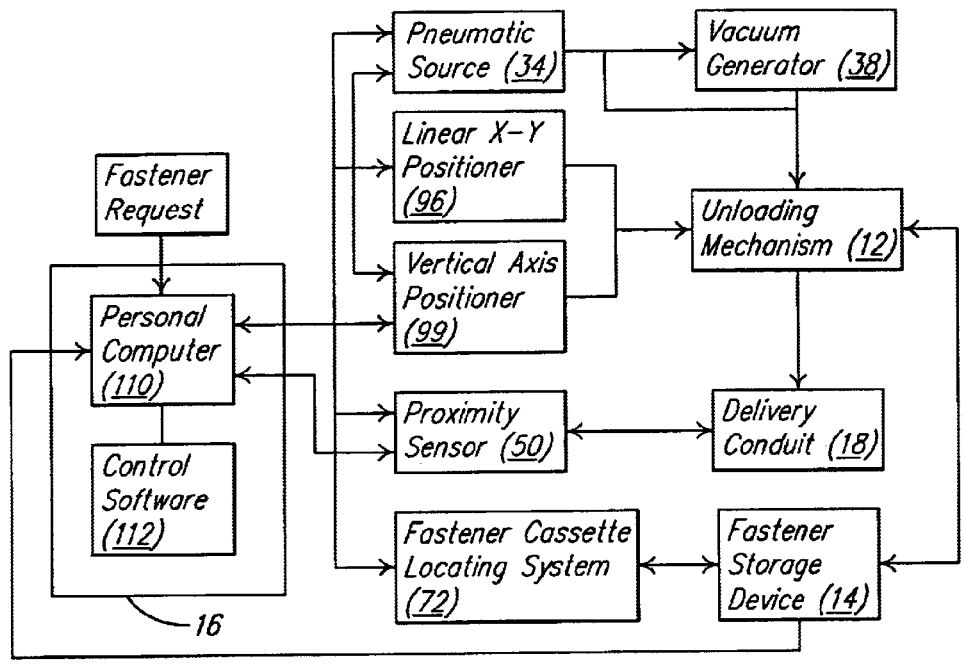
FIG. 18 is a block diagram of the communications of a control system in accordance with the present invention.

Referring to FIG. 18, the control system 16 generally comprises a computing device 110 (e.g., personal computer, programmable logic controller) that is in communication with the pneumatic source 34, the linear X-Y positioner 96, the vertical axis positioner 99, the proximity sensor 50, and the fastener cassette locating system 72. Generally, the computing device 110 receives a request for a specific fastener configuration from an input device such as a grip length checker, microphone, computer operated pendant, computer keyboard or touch screen, or bar code reader or other auto identification system, among others, and activates the linear X-Y positioner 96 to move the unloading mechanism 12 adjacent the fastener storage device 14. The control system 16 then activates the pneumatic source 34 to activate the vertical axis positioner 99 to move the unloading mechanism 12 down against the fastener storage device 14. Further, the pneumatic source 34 then activates the vacuum generator 38 to remove a fastener from the fastener storage device 14 as previously described.

Once the unloading mechanism 12 has removed a fastener, the control system 16 then activates the pneumatic source 34 to move the unloading mechanism 12 up away from the fastener storage device 14. The control system 16 then activates linear X-Y positioner 96 to position the unloading mechanism 12 adjacent the delivery conduit 18. Accordingly, the pneumatic source 34 activates the vertical axis positioner 99 to move the unloading mechanism 12 down against the delivery conduit 18 and further to deactivate the vacuum generator 38, thereby causing the fastener to drop into the delivery conduit 18. Once the fastener passes beyond the proximity sensor 50, the control system 16 activates the pneumatic source 34 once again to provided pressurized air to deliver the fastener to the work station. As further shown, the control system 16 is also in communication with the fastener cassette locating system 72 to recognize whether the fastener storage device 14 is installed or removed from the portable fastener delivery system 10.

The computing device 110 executes control software 112, which comprises a database having system parameters and fastener parameters. The system parameters comprise for example, parameters for the fastener cassette 58 such as the position of each fastener storage tube 60, the fastener configuration in each tube, and the current number of fasteners in each tube. As the portable fastener delivery system 10 delivers fasteners, the control software 112 maintains a real-time count of the fasteners remaining in the fastener cassette 58. The system parameters further comprise, but are not limited to, the amount of time that the pneumatic source 34 is activated throughout operation of the portable fastener delivery system 10, and the velocity and acceleration of the linear X-Y positioner 96, among others.

The fastener parameters comprise, for example, the fastener identification (e.g., ST3M760T 4-10, which is a 0.250" diameter hi-lok with a 0.625" grip length), the fastener diameter and grip length, the corresponding extractor catcher 92, drop station chute 48, and amount of time that the pneumatic source 34 is activated once the fastener passes beyond the proximity sensor 50. Additional fastener parameters may be employed depending on the type of fasteners and the configuration of the portable fastener delivery system 10.

The control system 16 further comprises associated electrical and pneumatic controls such as servo motors that activate the linear X-Y positioner 99 and the vertical axis positioner 99, among others. The electrical and pneumatic controls are commonly known in the art and shall not be described in further detail herein for purposes of clarity. Additionally, the request for a specific fastener configuration from the devices as previously set forth may be through a hard-wired connection, radio frequency (RF) transmissions, optical signals, and voice-activated signals, among others known in the art.

Operation of the Portable Fastener Delivery System

Figure 19:
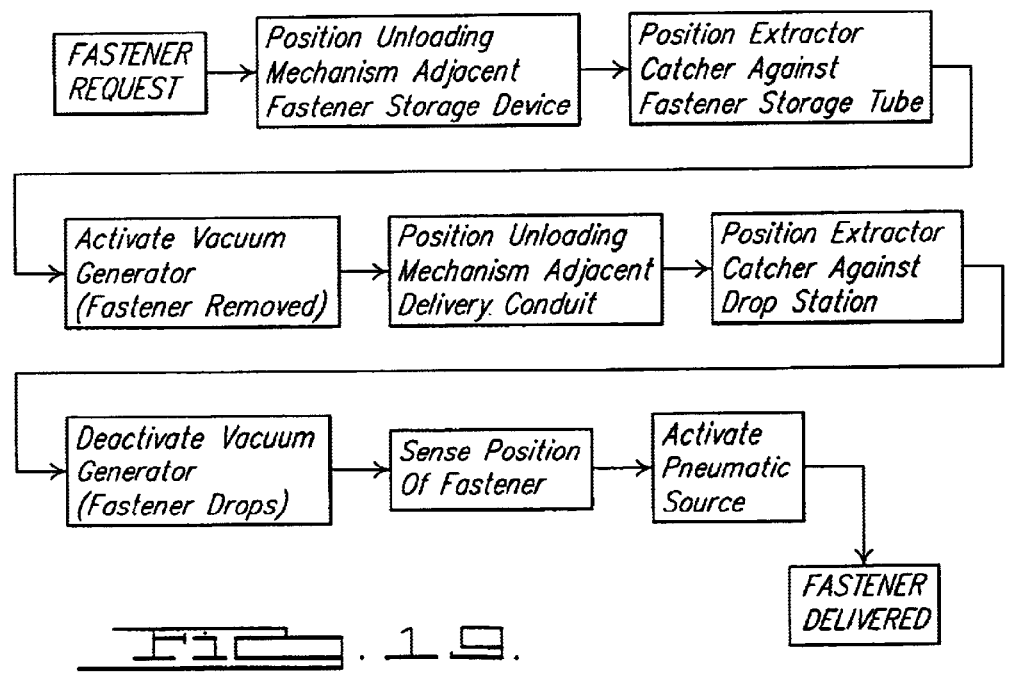
FIG. 19 is a flow diagram of a portable fastener delivery system delivering a fastener in accordance with the present invention.

In operation, the portable fastener delivery system 10 delivers fasteners according to the flow diagram as depicted in FIG. 19 and the previously described figures. Initially, the control system 16 receives a request for a specific fastener configuration. The control system 16 then identifies, through the execution of the control software 112 within the computing device 110 (not shown), which fastener storage tube 60 within the fastener storage device 14 contains the proper fastener. Once the appropriate fastener storage tube 60 is identified, the control system activates the linear X-Y positioner to position the unloading mechanism 12 adjacent the fastener storage device 14, and more specifically, to position the extractor catcher 92 adjacent the appropriate fastener storage tube 60.

Once the extractor tool 90 is properly positioned, the pneumatic source 34 is activated to cause the vertical axis positioner 99 to force the extractor catcher 92 down against the seal 80 disposed around the fastener delivery tube 60. When the extractor catcher 92 abuts the seal 80, the vacuum generator 38 is activated to cause the fasteners within the fastener storage tube 60 to move upward against the extractor catcher 92. When the top fastener abuts the upper surface 100 of the extractor catcher 92, a seal is formed therebetween and the remaining fasteners fall back down into the fastener storage tube 60.

The pneumatic source 34 then activates the vertical axis positioner 99 to move the extractor tool 90 up and away from the fastener storage device 14 and the control system activates the linear X-Y positioner 96 to position the unloading mechanism 12 adjacent the delivery conduit 18. More specifically, the linear X-Y positioner 96 positions the extractor catcher 92 adjacent the appropriate chute 48 of the drop plate 46. The pneumatic source 34 then activates the vertical axis positioner 99 to force the extractor catcher 92 down against the drop plate 46. The vacuum generator 38 is then deactivated and the fastener is dropped down into the fixed fastener delivery tube 42. Accordingly, the fastener is transported through the fixed fastener delivery tube 42 by gravity.

As the fastener is transported through the fixed fastener delivery tube 42 by gravity, the fastener passes beyond the proximity sensor 50. The proximity sensor 50 then notifies the control system 16 that the fastener has passed and is positioned within the flexible fastener delivery tube 44, and the control system 16 activates the pneumatic source 34. Accordingly, the pneumatic source 34 provides pressurized air through the flexible fastener delivery tube 44 to deliver the fastener to a work station.

The cumulative amount of time in one form of the present invention from when the control system 16 receives a request for a fastener to the time when the fastener is delivered to the work station is approximately less than 3 seconds. Accordingly, an efficient and portable system for the delivery of fasteners is provided by the present invention.

Although the present invention discloses a system for the delivery of fasteners, other types of components may also be removed and delivered according to the teachings of the present invention for a variety of applications. For example, the system may be employed to deliver detail parts for an assembly or even components for other applications such as food delivery, mail delivery, and a wide range of other applications. Accordingly, the delivery of fasteners for assembly operations shall not be construed as limiting the scope of the present invention.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. An apparatus for delivering fasteners comprising:

a portable platform;

at least one fastener storage device disposed on the portable platform;

at least one unloading mechanism in communication with the fastener storage device;

a control system that regulates delivery of the fasteners; and at least one delivery conduit in communication with the unloading mechanism, wherein when a signal is transmitted to the control system requesting at least one fastener, the control system activates the unloading mechanism to retrieve at least one fastener from the fastener storage device, thereby causing the fastener to be transported through the delivery conduit.

2. The apparatus of claim 1, wherein the control system further comprises a pneumatic source that causes the fastener to be removed from the fastener storage device and transported through the delivery conduit.

3. The apparatus of claim 2 further comprising a proximity sensor disposed along the delivery conduit, wherein when the fastener is transported past the proximity sensor, the control system activates the pneumatic source to provide pressurized air to deliver the fastener.

4. The apparatus of claim 3, wherein the delivery conduit further comprises:
 a fixed fastener delivery tube disposed within the portable platform; and
 a flexible fastener delivery tube in communication with the fixed fastener delivery tube that extends to a work station,
 wherein the unloading mechanism delivers the fastener to the fixed fastener delivery tube and the fastener is transported through the fixed fastener delivery tube by gravity, and the fastener is transported through the flexible fastener delivery tube by the pneumatic source after the fastener is transported beyond the proximity sensor.

5. The apparatus of claim 4, wherein the fixed fastener delivery tube and the flexible fastener delivery tube are connected using a fitting comprising flexible prongs, wherein the fitting is secured to the fixed fastener delivery tube, and the flexible fastener delivery tube is inserted between the flexible prongs.

6. The apparatus of claim 5 further comprising an adhesive tape that is wrapped around the fitting to further secure and seal the connection between the fixed fastener delivery tube and the flexible fastener delivery tube.

7. The apparatus of claim 2, wherein the unloading mechanism further comprises:
 at least one extractor tool having an upper end and a lower end;
 at least one vacuum generator disposed at the upper end of the extractor tool; and
 an extractor catcher disposed at the lower end of the extractor tool,
 wherein when the control system activates the unloading mechanism, the extractor tool is positioned adjacent the fastener storage device and the pneumatic source activates the vacuum generator to cause a fastener to abut the extractor catcher for removal of the fastener from the fastener storage device.

8. The apparatus of claim 7, wherein the fastener storage device houses a plurality of fasteners and when the pneumatic source activates the vacuum generator, the plurality of fasteners are drawn up into the extractor catcher, and when a top fastener abuts the extractor catcher, the remaining fasteners are dropped back down into the fastener storage device.

9. The apparatus of claim 8, wherein the fastener storage device further comprises at least one fastener cassette that houses at least one fastener storage tube that houses the plurality of fasteners.

10. The apparatus of claim 9, wherein the fastener storage tube is in a coiled configuration.

11. The apparatus of claim 9 further comprising a fastener tube cartridge that houses the fastener storage tube, wherein the fastener tube cartridge is removable.

12. The apparatus of claim 9 further comprising an upper plate and a lower plate that house the fastener storage tube.

13. The apparatus of claim 12, wherein the upper plate and the lower plate are removable.

14. The apparatus of claim 9, wherein the fastener storage device further comprises at least one seal disposed adjacent the fastener storage tube such that when the extractor tool is positioned adjacent the fastener storage device, the extractor catcher abuts the seal, thereby providing a sealed connection between the fastener storage tube and the extractor catcher and preventing the fastener from swinging out of a vertical position.

15. The apparatus of claim 9, wherein the unloading mechanism further comprises an extractor shroud disposed around the extractor catcher.

16. The apparatus of claim 1, wherein the control system further comprises a positioning device that positions the unloading mechanism adjacent the fastener storage device for removal of the fastener and adjacent the delivery conduit for delivery of the fastener.

17. The apparatus of claim 16, wherein the positioning device comprises a linear X-Y positioner.

18. The apparatus of claim 16, wherein the positioning device comprises a vertical axis positioner.

19. The apparatus of claim 1, wherein the control system further comprises a computing device having control software, wherein system parameters are stored in the computing device and are processed by the control software.

20. The apparatus of claim 19, wherein the control software further comprises a database that stores the system parameters.

21. The apparatus of claim 20, wherein the system parameters further comprise portable fastener delivery system parameters and fastener parameters.

22. The apparatus of claim 21, wherein the portable fastener delivery system parameters further comprise fastener cassette parameters.

23. The apparatus of claim 19, wherein the computing device further comprises a touch screen, wherein the request for a fastener is made using the touch screen.

24. The apparatus of claim 19, wherein the computing device is in communication with a computer screen that displays a digital image of an assembly.

25. The apparatus of claim 1, wherein the fastener storage device is removable.

26. The apparatus of claim 25 further comprising a fastener cassette cradle, wherein the fastener storage device is slidably disposed along the fastener cassette cradle.

27. The apparatus of claim 25, wherein the fastener storage device further comprises at least one handle to install, transport, and remove the fastener storage device.

28. The apparatus of claim 1, wherein the fastener storage device further comprises a smart cassette in communication with the control system, wherein the smart cassette maintains current information relating to the fasteners within the fastener storage device.

29. The apparatus of claim 1 further comprising a locating system that communicates proper positioning of the fastener storage device to the control system.

30. The apparatus of claim 29, wherein the locating system further comprises:
 a position switch disposed on the portable platform adjacent one end of the fastener storage device; and
 a pivoted latch disposed on the portable platform adjacent another end of the fastener storage device,
 wherein when the fastener storage device is properly positioned, the position switch is activated and the pivoted latch engages the fastener storage device.

31. The apparatus of claim 30 further comprising a second position switch disposed on the pivoted latch, wherein the second position switch communicates to the control system that the fastener storage device is locked in place.

32. The apparatus of claim 1, wherein the portable platform further comprises a mobile cart.

33. The apparatus of claim 1, wherein the delivery conduit further comprises a drop station, wherein the unloading mechanism transports the fastener from the fastener storage device to the drop station for transportation of the fastener through the delivery conduit.

34. The apparatus of claim 33, wherein the drop station further comprises at least one drop plate, the drop plate comprising at least one chute having a size that corresponds with a specific fastener configuration.

35. The apparatus of claim 34, wherein the chute is tapered.

36. The apparatus of claim 1, wherein the signal is transmitted using an input device.

37. The apparatus of claim 36, wherein the input device is a touch screen.

38. The apparatus of claim 36, wherein the input device is a microphone.

39. The apparatus of claim 36, wherein the input device is an auto identification system.

40. The apparatus of claim 36, wherein the input device is a grip length checker.

41. The apparatus of claim 36, wherein the input device transmits the signal using a hard-wired connection.

42. The apparatus of claim 36, wherein the input device transmits the signal using radio frequency signals.

43. The apparatus of claim 36, wherein the input device transmits the signal using optical signals.

44. The apparatus of claim 36, wherein the input device transmits the signal using voice-activated signals.

45. The apparatus of claim 1 further comprising a protective cover.

46. The apparatus of claim 1, wherein the fastener storage device is stackable.

47. The apparatus of claim 1, wherein the control system further comprises a computing device having control software, wherein system parameters are stored in the computing device and are processed by the control software.

48. The apparatus of claim 47, wherein the control software further comprises a database that stores the system parameters.

49. The apparatus of claim 1, wherein the signal is transmitted using an input device.

50. The apparatus of claim 49, wherein the input device is a touch screen.

51. The apparatus of claim 49, wherein the input device is a microphone.

52. The apparatus of claim 49, wherein the input device is an auto identification system.

53. The apparatus of claim 49, wherein the input device transmits the signal using a hard-wired connection.

54. The apparatus of claim 49, wherein the input device transmits the signal using radio frequency signals.

55. The apparatus of claim 49, wherein the input device transmits the signal using optical signals.

56. The apparatus of claim 49, wherein the input device transmits the signal using voice-activated signals.

57. A method for delivering fasteners comprising the steps of:
(a) transmitting a signal to a control system of a portable fastener delivery system, the signal comprising a request for at least one fastener;
(b) positioning an unloading mechanism adjacent a fastener storage device;
(c) removing at least one fastener from the fastener storage device and securing the fastener within the unloading mechanism;
(d) positioning the unloading mechanism adjacent at least one delivery conduit; and
(e) causing the control system to deliver the fastener through the delivery conduit.

58. The method of claim 57 further comprising the step of activating a pneumatic source to remove the fastener from the fastener storage device and deliver the fastener through the delivery conduit.

59. The method of claim 58 further comprising the steps of:
(a) activating at least one vacuum generator to remove the fastener from the fastener storage device;
(b) holding the fastener within the unloading mechanism with the vacuum generator while the unloading mechanism is being positioned adjacent the delivery conduit;
(c) deactivating the vacuum generator when the unloading mechanism is positioned adjacent the delivery conduit, causing the fastener to drop into the delivery conduit; and
(d) activating the pneumatic source to deliver the fastener using pressurized air.

60. The method of claim 59, wherein a plurality of fasteners stored within the fastener storage device are drawn up when the vacuum generator is activated and are dropped down when a top fastener engages an extractor catcher disposed within unloading mechanism.

61. The method of claim 58 further comprising the steps of
(a) dropping the fastener from the unloading mechanism into a fixed fastener delivery tube, wherein the fastener is transported through the fixed fastener delivery tube by gravity;
(b) sensing the position of the fastener within the fixed fastener delivery tube with a proximity sensor; and
(c) activating the pneumatic source to provide pressurized air to deliver the fastener through a flexible fastener delivery tube once the proximity sensor senses the position of the fastener.

62. An apparatus for delivering fasteners comprising:
a mobile platform;
at least one fastener storage device disposed on the mobile platform;
at least one unloading mechanism in communication with the fastener storage device;
at least one delivery conduit in communication with the unloading mechanism;
a positioning device that positions the unloading mechanism adjacent the fastener storage device for removal of the fastener from the fastener storage device and adjacent the delivery conduit for delivery of the fastener;
a pneumatic source in communication with the unloading mechanism that causes removal of the fastener from the fastener storage device and delivery of the fastener through the delivery conduit; and
a control system that communicates with the positioning device and the pneumatic source to regulate delivery of the fasteners;
wherein when a signal is transmitted to the control system requesting at least one fastener, the control system activates the positioning device and the pneumatic source, thereby causing the fastener to be removed from the fastener storage device and transported through the delivery conduit.

63. The apparatus of claim 62 further comprising a proximity sensor disposed along the delivery conduit, wherein when the fastener is transported beyond the proximity sensor, the control system activates the pneumatic source to provide pressurized air to deliver the fastener.

64. The apparatus of claim 63, wherein the delivery conduit further comprises:
- a fixed fastener delivery tube disposed within the portable platform; and
- a flexible fastener delivery tube in communication with the fixed fastener delivery tube,
- wherein the unloading mechanism delivers the fastener to the fixed fastener delivery tube and the fastener is transported through the fixed fastener delivery tube by gravity, and the fastener is transported through the flexible fastener delivery tube by the pneumatic source after the fastener is transported beyond the proximity sensor.

65. The apparatus of claim 62, wherein the unloading mechanism further comprises:
- at least one extractor tool having an upper end and a lower end;
- at least one vacuum generator disposed at the upper end of the extractor tool; and
- an extractor catcher disposed at the lower end of the extractor tool,
- wherein when the control system activates the unloading mechanism, the extractor tool is positioned adjacent the fastener storage device and the pneumatic source activates the vacuum generator to cause a fastener to abut the extractor catcher for removal of the fastener from the fastener storage device.

66. The apparatus of claim 65, wherein the fastener storage device houses a plurality of fasteners and when the pneumatic source activates the vacuum generator, the plurality of fasteners are drawn up into the extractor catcher, and when a top fastener abuts the extractor catcher, the remaining fasteners drop back down into the fastener storage device.

67. The apparatus of claim 66, wherein the fastener storage device further comprises:
- at least one fastener storage tube that houses the plurality of fasteners.

68. The apparatus of claim 67, wherein the fastener storage tube is in a coiled configuration.

69. The apparatus of claim 67, wherein the fastener storage device further comprises at least one seal disposed adjacent the fastener storage tube such that when the extractor tool is positioned adjacent the fastener storage device, the extractor catcher abuts the seal, thereby providing a sealed connection between the fastener storage tube and the extractor catcher.

70. The apparatus of claim 62, wherein the positioning device further comprises a linear X-Y positioner.

71. The apparatus of claim 62, wherein the positioning device further comprises a vertical axis positioner.

72. The apparatus of claim 62, wherein the control system further comprises a computing device having control software, wherein system parameters are stored in the computing device and processed by the control software.

73. An apparatus for delivering components comprising:
- a portable platform;
- at least one component storage device disposed on the portable platform;
- at least one unloading mechanism in communication with the component storage device;
- a control system that regulates delivery of the components; and
- at least one delivery conduit in communication with the unloading mechanism,
- wherein when a signal is transmitted to the control system requesting at least one component, the control system activates the unloading mechanism to retrieve at least one component from the component storage device, thereby causing the component to be transported through the delivery conduit.

74. The apparatus of claim 73, wherein the control system further comprises a pneumatic source that causes the component to be removed from the component storage device and transported through the delivery conduit.

75. The apparatus of claim 73, wherein the component is a fastener.

* * * * *